Figure 1:
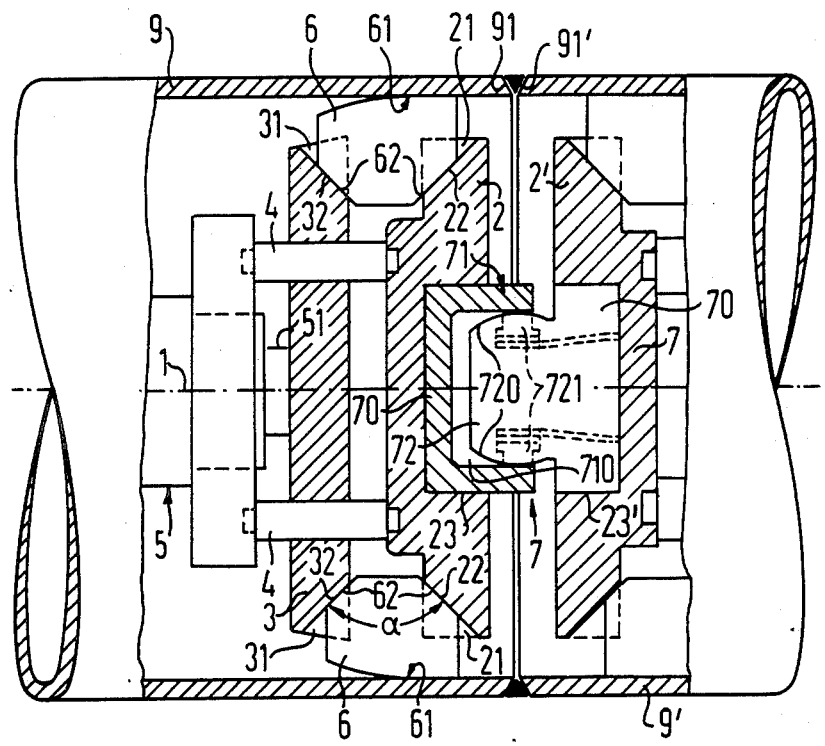

United States Patent [19]

Weber et al.

[11] Patent Number: 4,689,863

[45] Date of Patent: Sep. 1, 1987

[54] FIXTURE FOR MACHINING THE CUTTING LINE OF A PIPE

[75] Inventors: Robert Weber, Uttenreuth; Roland Bieselt, Weinheim; Siegfried Förner, Herzogenaurach; Helmut Mechtold, Nürnberg, all of Fed. Rep. of Germany

[73] Assignee: Kraftwerk Union Aktiengesellschaft, Mülheim, Fed. Rep. of Germany

[21] Appl. No.: 613,907

[22] Filed: May 24, 1984

[30] Foreign Application Priority Data

May 27, 1983 [DE] Fed. Rep. of Germany ....... 3319319

[51] Int. Cl.⁴ ...................... B23Q 39/00; B23K 37/04
[52] U.S. Cl. ...................................... 29/33 T; 72/123;
228/49.2; 269/43; 269/48.1
[58] Field of Search .................. 408/79, 80, 81, 82;
409/139, 140, 199, 307; 29/33 T; 228/48, 49.2;
269/43, 48.1; 72/122, 123, 125

[56] References Cited

U.S. PATENT DOCUMENTS

| 1,840,736 | 1/1932 | Ostlind | 408/82 |
|---|---|---|---|
| 1,846,437 | 2/1932 | Pippin | 72/125 |
| 1,980,288 | 11/1934 | Olson | 408/81 |
| 2,840,136 | 6/1958 | Bellarts | 72/123 |
| 2,878,770 | 3/1959 | Work et al. | 269/48.1 |
| 2,887,972 | 5/1959 | Handley | 269/48.1 |
| 3,011,539 | 12/1961 | Henrickson | 72/123 |
| 3,115,859 | 12/1963 | Haussler et al. | 269/48.1 |
| 3,362,603 | 1/1968 | Bauer et al. | 269/48.1 |
| 4,253,599 | 3/1981 | Slavens | 269/48.1 |

FOREIGN PATENT DOCUMENTS

| 24276 | 12/1956 | Fed. Rep. of Germany | 269/48.1 |
|---|---|---|---|
| 2829182 | 1/1980 | Fed. Rep. of Germany | 408/82 |

Primary Examiner—Gil Weidenfeld
Assistant Examiner—Daniel W. Howell
Attorney, Agent, or Firm—Herbert L. Lerner; Laurence A. Greenberg

[57] ABSTRACT

Fixture for machining the cutting line of a pipe, including a centering device insertible into an end section of the pipe, the centering device including a clamping system having pressure pieces with pressure surfaces formed thereon, the pressure pieces being disposed about the longitudinal axis of the centering device, and a pressure motor for driving the pressure pieces in radial direction of the pipe, for maintaining an equal distance between each of the pressure surfaces and the longitudinal axis of the centering device and for holding the centering device in the pipe with the clamping system, and a coupling device disposed at an end of the centering device along the longitudinal axis thereof for mounting an accessory device.

10 Claims, 2 Drawing Figures

FIXTURE FOR MACHINING THE CUTTING LINE OF A PIPE

The invention relates to a fixture for machining the cutting line of a pipe, including a centering device insertible into the end section of the pipe, having a clamping system with pressure pieces disposed about the longitudinal axis of the centering device and being driven by a pressure motor in the radial direction, in such a manner that pressure surfaces of the pressure pieces are always disposed at the same distance from the longitudinal axis.

Fixtures of this type are required for preparing the cutting line of two tubes that are to be welded together in the welding operation. Since only a very small offset of the cutting lines of the two pipe ends is permissible in the welded pipes, the two pipes must be aligned very carefully prior to the welding operation. However, since the pipes sometimes deviate slightly from a circular shape, the offset of the two cutting lines cannot always be kept within the permissible tolerance range by alignment. One or the other of the pipe ends must then be additionally centered, i.e., pushed into circular form or even expanded.

Fixtures suitable for this purpose are known in the art. They are in the form of centering devices which are disposed at an axial distance and can be operated simultaneously by the same pressure motor. One of the devices is inserted into one pipe end and the other one is inserted into the second pipe end; the fixture is accordingly large, heavy and therefore, difficult to handle.

In addition, the following requirements which apply in practice, cannot be met by the known fixtures:

It should be possible, for instance to center the two pipe ends separately from each other and to measure them in order to determine whether or not further machining, particularly turning in a lathe or expansion, is necessary.

In additional operations which might be required prior to the alignment of the pipes, it should to be necessary to again remove the centering devices inserted into the pipe ends. This centering device should instead be useful for these additional machining operations since the devices as a rule require a centered pipe; this is the case, for instance, in turning and in expanding.

The fixture should finally also make it possible to join the tubes together with their central axes inclined at an angle relative to each other. The fixture should also be usable if one of the two cutting lines is located in a pipe bend without extended legs.

It is accordingly an object of the invention to provide a fixture for machining the cutting line of a pipe, which overcomes the hereinafore-mentioned disadvantages of the heretofore-known devices of this general type.

With the foregoing and other objects in view there is provided, in accordance with the invention a fixture for machining the cutting line of a pipe, comprising a centering device insertible into an end section of the pipe, the centering device including a clamping system having pressure pieces with pressure surfaces formed thereon, the pressure pieces being disposed about the longitudinal axis of the centering device, and a pressure motor for driving the pressure pieces in radial direction of the pipe, for maintaining an equal distance between each of the pressure surfaces and the longitudinal axis of the centering device and for holding the centering device in the pipe with the clamping system, and a coupling device disposed at an end of the centering device along the longitudinal axis thereof for mounting an accessory device.

In accordance with a another feature of the invention the accessory device is another centering device.

In accordance a further feature of the invention the accessory device is a pipe expanding device.

In accordance with an additional feature of the invention the accessory device is a turning device.

In accordance with an added feature of the invention the coupling device includes a coupling part having a cylindrical receptacle formed therein, and a coupling post having a spherical surface formed thereon matching the cylindrical receptacle.

In accordance with yet another feature of the invention, the coupling device includes a locking device for adjustably fixing the coupling part and the post to each other.

In accordance with yet a further feature of the invention, the centering device includes connecting elements, and the coupling part and coupling post have end sections of similar dimensions matched to the connecting elements, for selectively coupling the centering device to the coupling part and to the coupling post.

In accordance with yet an additional feature of the invention, the coupling device is fastened to the centering device with the axes of the coupling part and the coupling post coaxial with the longitudinal axis of the centering device.

In accordance with yet an added feature, the coupling part is moveable along a plane perpendicular to the longitudinal axis of said centering device.

In accordance with an alternate feature of the invention, the coupling post is movable along a plane perpendicular to the longitudinal axis of the centering device.

In accordance with still another feature of the invention, each of the pressure pieces have wedge-shaped support surface formed thereon extending in substantially opposite directions, and the centering device includes a base plate, and a pressure plate being movable relative to the base plate along the longitudinal axis of the centering device by the pressure motor, the base plate and pressure plate having radially-outwardly directed wedge surfaces formed thereon resting against the wedge-shaped support surfaces, the wedge surfaces of said base plate and support plate mutually enclosing an abtuse angle greater than an angle which would cause the base plate, pressure plate and pressure pieces to automatically lock against each other.

In accordance with still a further feature of the invention, the base plate and the pressure plate are rotatable about the longitudinal axis of the centering device, the wedge surfaces of the base plate and pressure plate are conical, and the pressure pieces are pressure rollers supported on the conical surfaces, and including a drive motor coupleable to the coupling device for rotating the base plate and pressure plate.

In accordance with still an additional feature of the invention, the pressure pieces are guided in radial slots formed in the base plate and pressure plate.

In accordance with still an added feature of the invention, the pressure pieces have different radial lengths and are insertible into the slots.

In accordance with again another feature of the invention, the pressure pieces include means for adjusting and setting different radial lengths.

In accordance with again an additional feature of the invention, the centering device and coupling device have a central, coaxial, control channel formed therein.

In accordance with again an additional feature of the invention, the pressure motor is a hydraulic motor having a ring cylinder disposed about the control channel and pressure lines led through the control channel.

In accordance with a concomitant feature of the invention, the accessory device has an entrance slot formed therein extending radially up to the control channel and over the entire length of the accessory device, permitting installation over the pressure lines of the centering device disposed in the pipe.

The invention differs from the known fixtures in that two centering devices having separate pressure motors are provided which can be separated by the coupling device: this makes it possible to insert one centering device which is correspondingly lighter and easier to handle, into the one pipe end, to center the latter and to subsequently measure it. This is possible even in pipe bends without an extended leg: for this purpose, the centering device has pressure pieces which are exchangable and/or adjustable in length and which are preferably adjusted in accordance with a prefabricated template. The deviation thereof from the circular shape depends on the distance from the pressure pieces to the cutting line of the pipe bend. In this manner, it is then also possible to push the cutting line of such a pipe bend into a circular shape, although the centering device engages a region of the pipe bend which deviates more or less from the circular shape.

After the centering of the one pipe end and the measuring operation which is then possible without problems, the second pipe end is then centered and measured in a second centering device of similar construction. If, in the process, an offset is determined which can no longer be compensated by the centering device itself, one or the other pipe end must be expanded. For this purpose it is no longer necessary to remove the centering devices from the pipe ends; rather, an expansion device with a coupling flange fitting the coupling device of the centering device is put in place; it is then already assured that the expansion device is centered relative to the pipe.

Sometimes, however, it is found that one pipe end must be shortened, cut at an angle or provided with a new welding lip. Therefore, according to the invention, the turning-off device is provided with a corresponding coupling device which makes it possible to place the turning-off device on the centering device which is already clamped in one tube end.

The two centered pipe ends must be aligned for the welding operation proper, if applicable, after the machining operations explained above are completed. To this end, the two centering devices are connected together by means of the coupling device and are fixed, after the pipes are aligned, by a locking device provided in the coupling device. The coupling device is constructed in this case in such a way that the central axes of its two halves, namely the coupling part and the coupling post, can enclose an obtuse angle between them: it is therefore also possible to join together pipe ends with longitudinal axes that are inclined relative to each other.

The two halves of the coupling device preferably have similar end pieces (equal shape, dimensions and tapped holes) and the centering devices have matching connecting elements; the centering devices required for aligning two pipe parts can therefore be of identical construction. Practically speaking, the connecting elements for receiving the coupling parts are constructed in such a way that the coupling post or the other coupling part can be fastened in different positions within a plane perpendicular to the axis of the centering device. An axial alignment of a pipe at a bend without extended legs is therefore also possible.

The accessories which can be used in conjunction with a centering device and can be coupled to the latter preferably have a centrally located control channel for receiving control lines, particularly pressure lines, if the pressure motor of the centering device operates hydraulically. It is particularly advantageous to provide the accessory with an entrance slot which extends over the entire length of the accessory and radially from the outside to the central control channel; this makes it possible to couple the accessory to a centering device already installed in one pipe end without the need of interrupting its pressure line. In order to couple the accessory, the pressure line merely need be placed in the control channel through the entrance slot.

Thus, the invention permits a substantial simplification in the operation of joining pipe parts; above all, it permits very great flexibility which is of great importance in the installation of pipe lines at construction sites. However, the invention can be used equally advantageously for fabricating pipe lines in the factory.

Other features which are considered as characteristic for the invention are set forth in the appended claims.

Although the invention is illustrated and described herein as embodied in a fixture for machining the cutting line of a pipe, it is nevertheless not intended to be limited to the details shown, since various modifications and structural changes may be made therein without departing from the spirit of the invention and within the scope and range of equivalents of the claims.

Figure 2:
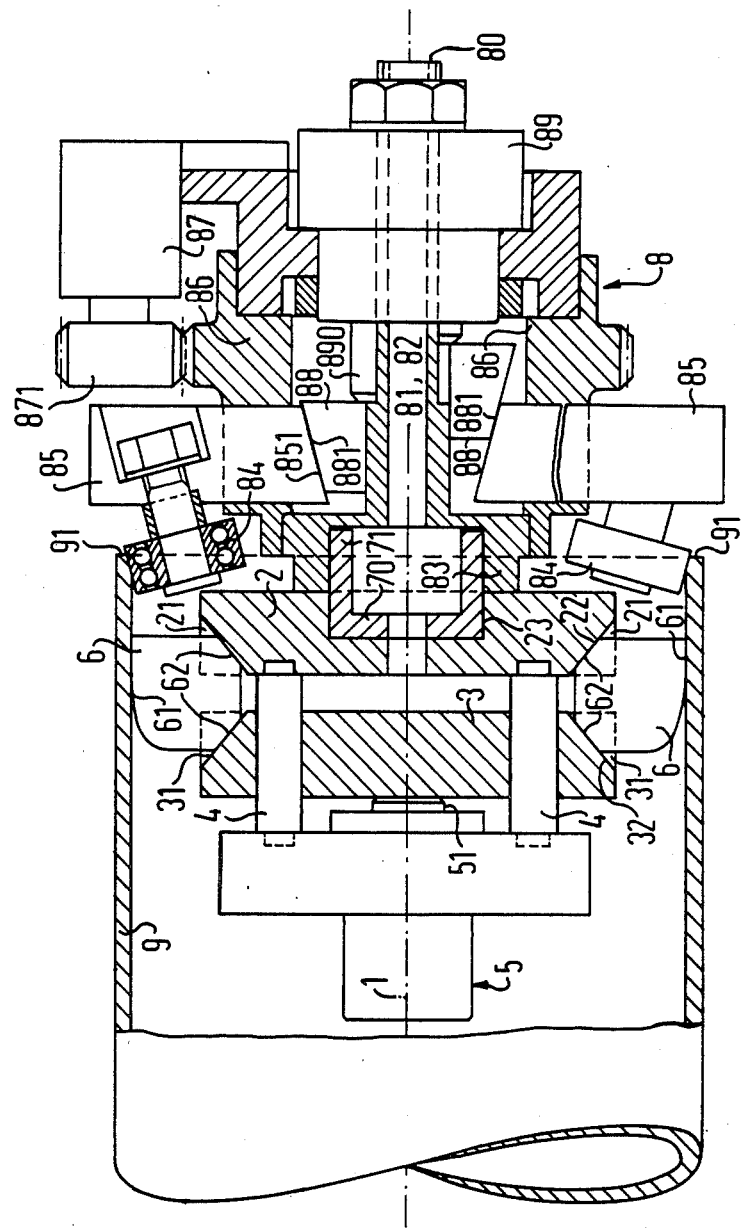

The construction and method of operation of the invention, however, toether with additional objects and advantages thereof will be best understood from the following description of specific embodiments when read in connection with the accompanying drawings, in which:

FIG. 1 is a fragmentary, longitudinal sectional view of two pipe ends to be joined together axially, toether with centering devices mounted therein; and FIG. 2 is a view similar to that of FIG. 1 of one of the pipe ends wherein a centering device with an expanding device coupled therewith is installed.

Referring now to the drawing and first, particularly, to FIG. 1 thereof, there is shown in an embodiment of the fixture for machining a cutting line of a pipe according to the invention, pipes 9 and 9' which are to be welded together and have already been centered by centering devices installed therein and axially aligned so that respective cutting lines 91 and 91' thereof are not offset from one another.

One centering device, which is inserted into the pipe 9 on the left-hand side of FIG. 1, is formed of a circular base plate 2 which is connected by connecting bolts 4 to a hydraulic pressure motor 5. A pressure plate 3 which is movably supported on the connecting bolts 4, rests against a pressure piston 51 of the pressure motor 5. The base plate 2 and the pressure plate 3 have radially outwardly extending slots 21, 31 formed therein, which are uniformly distributed over the periphery of the base plate. Prismatic pressure pieces 6 are guided in the slots 21, 31. At the slots, the plates 2, 3 have surfaces 22, 32 of a wedge formed thereon which are inclined in mutually opposite directions. The pressure pieces 6 have similarly inclined bearing surfaces 62 and pressure surfaces 61 formed thereon, so that the pressure pieces 6 are pushed radially outwardly, if the pressure plate 3 is shifted axially while the distance from the pressure surfaces 61 of all of the pressure pieces 6 to the longitudinal axis 1, remains constant. The wedge surfaces 22, 32 and the bearing surfaces 62 together include an angle alpha, which is larger than the self-locking or automatic-locking angle. In the sliding support provided in the embodiment, the self-locking angle must be greater than 15° so that the pressure pieces 6 are released again from the wedge position if the pressure plate 3 is retracted.

The return of the pressure pieces 6 can additionally be aided by radially-acting tension springs. It is also possible to construct the pressure pieces with a T-shape in the region of the bearing surfaces and to provide slots of appropriate shape in vicinity of the wedge surfaces of the base plate and the pressure plate. In this case, the pressure pieces would of necessity be pulled radially inwardly if the base plate and pressure plate are pulled apart.

As an alternative to this embodiment, each of the wedge surfaces of the base plate and pressure plate which are shown in the embodiment can also be part of a conical surface. The pressure pieces are then in the form of pressure rollers with suitable conical surfaces which are likewise pushed against the inner wall of the pipe 9 if the base plate and the pressure plate are pushed together. It is then additionally necessary to couple a drive motor from the outside, which sets the plates in a rotary motion about the longitudinal axis 1.

A second centering device which is constructed like the one described above is inserted into the second pipe section 9'. Only the base plate 2' of the second centering device is shown. This second centering device centers the second pipe section 9' on the same circular circumference as the pipe section 9.

The base plates 2 and 2' of the two centering devices have connecting elements of identical shape. In this case the connecting elements are in the form of recesses 23 23' having identical dimesions and a coupling device 7 mounted in the recesses for axially interconnecting the two centering devices. The coupling device 7 includes a coupling part 71 with a cylindrical receptacle 710 and a coupling post 72 with a spherical surface 720. These two coupling parts have end pieces having the same shape and the same dimensions, which fit into the recesses 23 formed in the base plates and are connected to the base plates, such as by screws.

The above-described structure of the coupling device makes it possible to align the two pipe sections in such a manner that their longitudinal axes abut at an obtuse angle. However, in the embodiment they are aligned in such a way that their longitudinal axes coincide. This position is then fixed by a locking device 721 in the coupling device 7 for the welding operation. In this case the locking device is formed of two hydraulic pistons which are indicated by broken lines and which frictionally hold the coupling post 72 in the receptacle 710.

FIG. 2 illustrates a fixture which is formed of a centering device and an expanding device 8 coupled thereto. The centering device has the same construction in FIG. 2 as that described in connection with FIG. 1 and is clamped in the end of the pipe 9 with a cutting line 91. In this case the base plate 2 is also equipped with a coupling part 71, having a central axis which lies along the longitudinal axis 1 of the pipe 9.

If it is determined during the centering of the pipe end that the diameter thereof is too small as compared with that of the pipe to be welded on, then the pipe end must be expanded. According to the invention, the centering device can remain in the pipe and even serves for holding the auxiliary device which is in the form of the expanding device 8. The expanding device has central support shaft 80 which is coaxially disposed on the coupling part 71 of the centering device and is connected thereto.

Disposed on the support shaft 80 is a hydraulic thrust motor 89 which is in turn disposed on a movable piston 890. The piston 890 acts on a thrust wedge 88 which has an inclined thrust surface 881 and can be moved longitudinally on the support shaft 80. Two different positions of the thrust wedge 88 are shown in the figure.

A roller support 85 is mounted on the thrust surface 881. The roller support 85 has an appropriately inclined wedge surface 851 which is guided in a roller runner 86 in such a way as to be radially movable. The roller runner 86 is in turn rotatably supported, coaxial with the longitudinal axis 1 and driven by a roller drive 87 through a pinion 871.

Rollers 84 are rotatably supported in the roller supports 85, in such a way that the axes of rotation thereof form an acute angle with the longitudinal axis 1 of the pipe 9. These rollers 84 run on the inner surface of the pipe 9 and are simultaneously pushed into the pipe by the thrust motor 89, so that the pipe end is expanded. An auxiliary device in the form of a cutting device can be coupled to the centering device disposed in the pipe in a manner similar to the assembly described above. The cutting line 91 can then be turned or cut down to another tulip-like profile.

Deviating from the expanding device described above, a device which works with a large number of radially-acting equidistant pressure cylinders instead of rotating rollers, can also be coupled on.

Independently of the structure of the accessory device, the accessory device has a control channel 81 which extends coaxially relative to the longitudinal axis 1. Control lines, particularly pressure lines, can be brought to the centering device which is already installed in the pipe, through the channel 81. In order to facilitate the coupling of required accessories to a centering device that is already installed in the pipe and in order to facilitate subsequent removal, the control channel 81 is accessible through an entrance slot 82 which extends radially outwardly over the entire length of the accessory. The control line and the pressure lines can move during the coupling and detaching of the accessory in vicinity of the entrance slot. In this connection, it may be advisable to provide at least one detachable bridging member, for closing the entrance slot after the pressure hose is introduced and for taking up the forces occurring in the operation of the accessory in order to relieve the walls of the control channel.

The foregoing is a description corresponding, in substance, to German application P 33 19 319.3, dated May 27, 1983, international priority of which is being claimed for the instant application, and which is hereby made part of this application. Any material discrepancies between the foregoing specification and the specification of the aforementioned corresponding German application are to be resolved in favor of the latter.

LIST OF TERMS

Fixture
Accessory device
Expanding device
Turning device
Centering device
Clamping system
1 Longitudinal axis
2, 2' Base
21 Slot
22 Wedge surface
22, 23' Connecting elements
3 Pressure plate
31 Slot
32 Wedge surface
4 Connecting bolt
5 Pressure motor
51 Pressure piston
6 Pressure pieces
61 Pressure area
62 Bearing surface
7 Coupling device
70 End section
71 Coupling part
710 Coupling receptacle
72 Coupling post
720 Spherical surface
721 Locking device
8 Expanding device
80 Support shaft
81 Control chanel
82 Entrance slot
83 Coupling flange
84 Rollers
85 Roller support
851 Wedge surface
86 Roller runner
87 Roller drive
871 Pinion
88 Thrust wedge
881 Thrust surface
89 Thrust motor
890 Piston
9, 9' Pipe
91, 91' Cutting line

We claim:

1. Fixture for machining the cutting line of a pipe, comprising a centering device insertible into an end section of the pipe, said centering device including a clamping system having pressure pieces with prismatic pressure surfaces formed thereon, said pressure pieces being disposed about the longitudinal axis of said centering device, and a pressure motor for driving said pressure pieces in radial direction of the pipe, for maintaining an equal distance between each of said pressure surfaces and the longitudinal axis of said centering device and for holding said centering device in the pipe with said clamping system, a coupling device disposed at an end of said centering device along the longitudinal axis thereof, said coupling device including a coupling part having a cylindrical receptacle formed therein; an accessory device in the form of another centering device including a coupling post having a spherical surface formed thereon matching said cylindrical receptacle; and hydraulic means for detachably connecting said coupling post to said cylindrical receptacle by remote control.

2. Fixture according to claim 1 wherein said detachable connecting means are in the form of a locking device of said first-mentioned coupling device for adjustably fixing said coupling part and said coupling post to each other.

3. Fixture according to claim 1, wherein said centering device includes connecting elements, and said coupling part and coupling post have end sections of similar dimensions matched to said connecting elements, for selectively coupling said centering device to said coupling part and to said coupling post.

4. Fixture according to claim 2, wherein said first-mentioned coupling device is fastened to said centering device with the axes of said coupling art and said coupling post coaxial with the longitudinal axis of the centering device.

5. Fixture according to claim 2, wherein said coupling part is movable perpendicular to the longitudinal axis of said centering device by exchanging said pressure pieces.

6. Fixture according to claim 2, wherein said coupling post is movable perpendicular to the longitudinal axis of said centering device by exchanging said pressure pieces.

7. Fixture according to claim 5, wherein said coupling post is movable perpendicular to the longitudinal axis of said centering device by exchanging said pressure pieces.

8. Fixture according to claim 1, wherein each of said pressure pieces have wedge-shaped support surfaces formed thereon extending in substantially opposite directions, and said first-mentioned centering device includes a base plate, and a pressure plate being movable relative to said base plate along the longitudinal axis of the centering device by the pressure motor, said base plate and pressure plate having radially-outwardly directed wedge surfaces formed thereon resting against said wedge-shaped support surfaces, said wedge surfaces of said base plate and support plate mutually enclosing an angle greater than an angle which would cause said base plate, pressure plate and pressure pieces to automatically lock against each other.

9. Fixture according to claim 1, wherein said first-mentioned centering device and first-mentioned coupling device have a central, coaxial, control channel formed therein.

10. Fixture according to claim 9, wherein said accessory device has pressure lines and has an entrance slot formed therein extending radially up to said control channel and over the entire length of said accessory device, permitting installation over said pressure lines of said first-mentioned centering device disposed in the pipe.

* * * * *